US012689718B2

(12) United States Patent
Shu

(10) Patent No.: US 12,689,718 B2
(45) Date of Patent: Jul. 21, 2026

(54) CHROMA ADJUSTMENT METHOD, ELECTRONIC DEVICE AND READABLE STORAGE MEDIUM

(71) Applicant: GUANGDONG OPPO MOBILE TELECOMMUNICATIONS CORP., LTD., Dongguang (CN)

(72) Inventor: Rai Shu, Yokohama (JP)

(73) Assignee: GUANGDONG OPPO MOBILE TELECOMMUNICATIONS CORP., LTD., Dongguang (CN)

( * ) Notice: Subject to any disclaimer, the term of this patent is extended or adjusted under 35 U.S.C. 154(b) by 485 days.

(21) Appl. No.: 18/449,678

(22) Filed: Aug. 14, 2023

(65) Prior Publication Data

US 2023/0388465 A1 Nov. 30, 2023

Related U.S. Application Data

(63) Continuation of application No. PCT/CN2021/079623, filed on Mar. 9, 2021.

(51) Int. Cl.
H04N 9/77 (2006.01)
G06T 7/90 (2017.01)
(Continued)

(52) U.S. Cl.
CPC ................. H04N 9/77 (2013.01); G06T 7/90 (2017.01); G06V 40/161 (2022.01); H04N 9/64 (2013.01); G06T 2207/10024 (2013.01)

(58) Field of Classification Search
None
See application file for complete search history.

(56) References Cited

U.S. PATENT DOCUMENTS 8,314,812 B1 * 11/2012 Eckel ..................... G09G 5/024
345/592
2005/0105147 A1 5/2005 Gruzdev et al.
2011/0007188 A1 * 1/2011 Manabe ................... G06T 5/92
348/240.2

FOREIGN PATENT DOCUMENTS

CN 101202926 6/2008
CN 105898252 8/2016
(Continued)

OTHER PUBLICATIONS

WIPO, International Search Report and Written Opinion for PCT/CN2021/079623, Dec. 8, 2021.
(Continued)

*Primary Examiner* — Bernard Krasnic
(74) *Attorney, Agent, or Firm* — Hodgson Russ LLP

(57) ABSTRACT

A chroma adjustment method, an electronic device and a non-transitory computer-readable storage medium are provided. The input color data is converted into preset color data in a preset color space. The preset color data is processed to determine a maximum chroma value among multiple chroma values for each of which the number of corresponding pixels is a peak in a chroma statistical graph, and a maximum luminance value of pixels corresponding to the maximum chroma value is determined. A chroma adjustment coefficient is obtained, according to the maximum chroma value, the maximum luminance value and a chroma mapping curve. The input color data is adjusted based on the chroma adjustment coefficient, to obtain output color data.

19 Claims, 5 Drawing Sheets

(51) Int. Cl.
    *G06V 40/16*       (2022.01)
    *H04N 9/64*       (2023.01)

(56)              References Cited

FOREIGN PATENT DOCUMENTS

| | | | | |
|----|-------------|---|---|---------|
| CN | 106657847   |   |   | 5/2017  |
| CN | 107424198   |   |   | 12/2017 |
| JP | H0561974    | A | * | 3/1993  |
| JP | H11134491   | A | * | 5/1999  |
| JP | 2009206903  |   |   | 9/2009  |
| JP | 2009212642  | A | * | 9/2009  |

OTHER PUBLICATIONS

CNIPA, First Office Action for CN Application No. 202180092946.
3, Apr. 14, 2026.

* cited by examiner

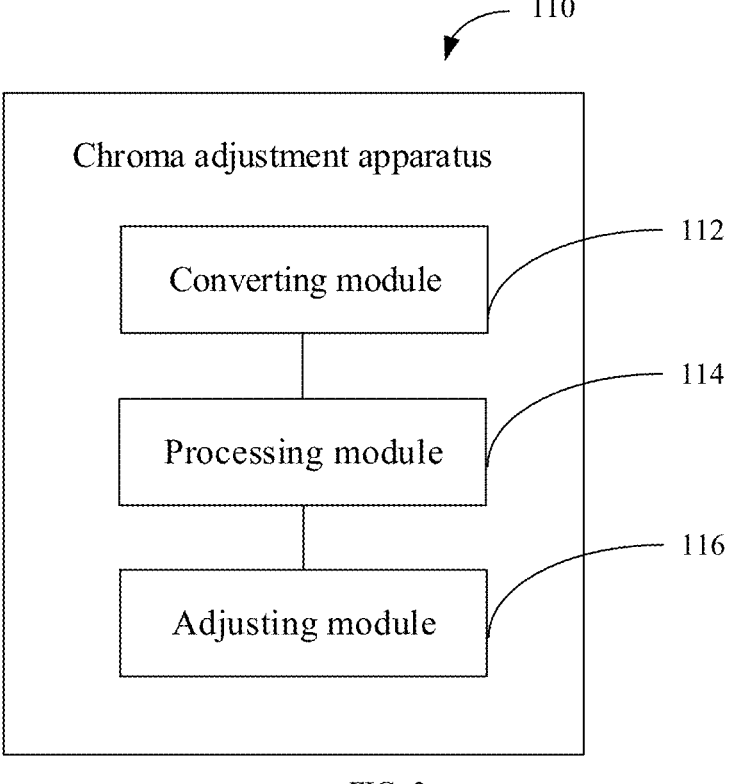
FIG. 3
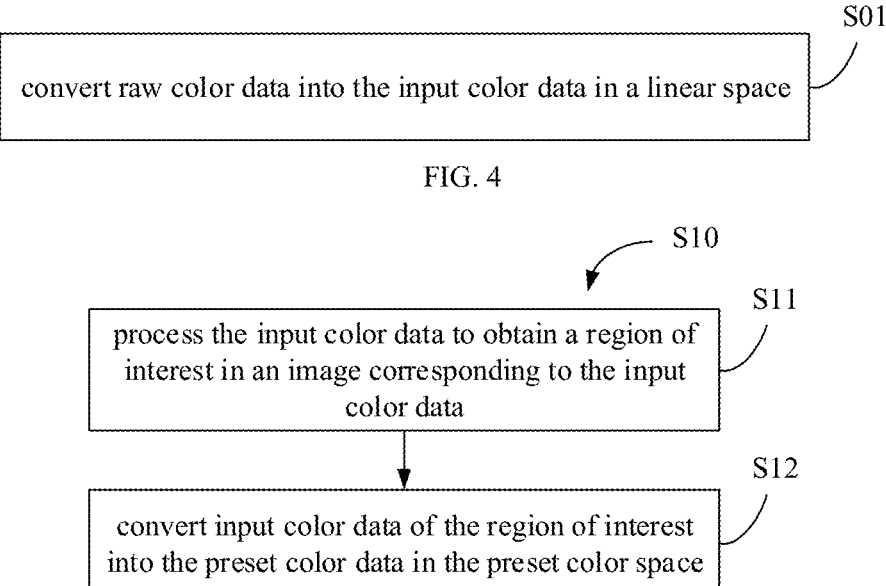
S01
convert raw color data into the input color data in a linear space
FIG. 4
S10
S11
process the input color data to obtain a region of interest in an image corresponding to the input color data
S12
convert input color data of the region of interest into the preset color data in the preset color space
FIG. 5

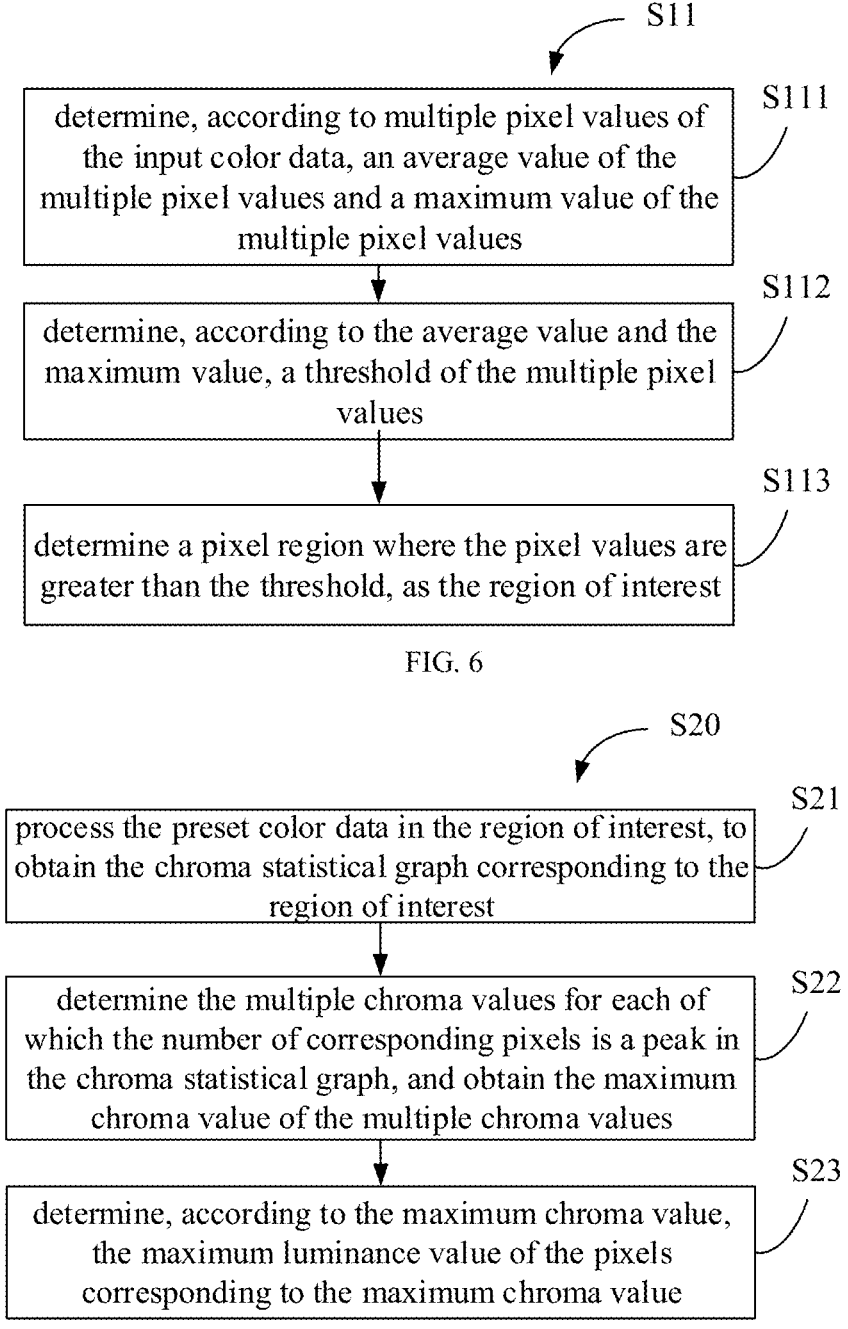

S11

S111
determine, according to multiple pixel values of the input color data, an average value of the multiple pixel values and a maximum value of the multiple pixel values S112
determine, according to the average value and the maximum value, a threshold of the multiple pixel values S113
determine a pixel region where the pixel values are greater than the threshold, as the region of interest

S21
process the preset color data in the region of interest, to obtain the chroma statistical graph corresponding to the region of interest S22
determine the multiple chroma values for each of which the number of corresponding pixels is a peak in the chroma statistical graph, and obtain the maximum chroma value of the multiple chroma values S23
determine, according to the maximum chroma value, the maximum luminance value of the pixels corresponding to the maximum chroma value

FIG. 7 the peak of the
numbers of the pixels   —▽—                              C_Locs_H

S30 obtain a target chroma value, according to the
maximum luminance value and the chroma
mapping curve

S31 determine the chroma adjustment coefficient,
according to a ratio of the target chroma value to
the maximum chroma value

S32

SatTargetCurve

L

L_max

Sat_Target   C_Locs_H

C fit chroma target values to obtain the chroma mapping curve

S02

CHROMA ADJUSTMENT METHOD, ELECTRONIC DEVICE AND READABLE STORAGE MEDIUM

CROSS-REFERENCE OF RELATED APPLICATIONS

This application is a continuation of International Application No. PCT/CN2021/079623, filed Mar. 9, 2021, the entire disclosure of which is incorporated herein by reference.

TECHNICAL FIELD

The disclosure relates to the field of image processing technologies, and particularly to a chroma adjustment method, an electronic device and a non-transitory readable storage medium.

BACKGROUND

In the related art, during processing an image, it requires to adjust chroma of the image several times for different scenes, to achieve a realistic and natural effect. However, the above process is cumbersome and cannot realize an automatic adjustment for chroma of the image.

SUMMARY

Embodiments of the disclosure provide a chroma adjustment method, an electronic device, and a non-transitory readable storage medium.

The Disclosure Provides the Chroma Adjustment Method. The Method Includes:

converting input color data into preset color data in a preset color space;

processing the preset color data to determine a maximum chroma value among multiple chroma values for each of which the number of corresponding pixels is a peak in a chroma statistical graph and determining a maximum luminance value of pixels corresponding to the maximum chroma value;

obtaining a chroma adjustment coefficient, according to the maximum chroma value, the maximum luminance value and a chroma mapping curve; and adjusting, based on the chroma adjustment coefficient, the input color data to obtain output color data.

The disclosure provides the electronic device which includes one or more processors. The one or more processors are configured to:

convert input color data into preset color data in a preset color space;

process the preset color data to determine multiple chroma values each of which has a greater number of corresponding pixels than two adjacent chroma values in a chroma statistical graph;

determine a maximum chroma value among the multiple chroma values and a maximum luminance value of pixels corresponding to the maximum chroma value;

obtain a chroma adjustment coefficient, according to the maximum chroma value, the maximum luminance value and a chroma mapping curve; and adjust, based on the chroma adjustment coefficient, the input color data to obtain output color data.

The disclosure provides a non-transitory computer-readable storage medium storing a computer program thereon, the computer program, when being executed by one or more processors, causes operations of a chroma adjustment method to be implemented, and the method includes:

converting input color data into preset color data in a preset color space, and acquiring a chroma statistical graph of the preset color data;

determining a maximum chroma value among a plurality of chroma values for each of which has a greater number of corresponding pixels than two adjacent chroma values in the chroma statistical graph, and acquiring a maximum luminance value of pixels having the maximum chroma value;

obtaining a chroma adjustment coefficient, based on the maximum chroma value, the maximum luminance value and a chroma mapping curve; and adjusting, based on the chroma adjustment coefficient, the input color data to obtain output color data.

Additional aspects, features and advantages of the disclosure will be provided at least in part in the following description, or will become apparent at least in part from the following description, or be learned from practicing the disclosure. The summary is not intended to limit the scope of any embodiments described herein

BRIEF DESCRIPTION OF THE DRAWINGS

The above and/or additional aspects and advantages of the disclosure will become apparent and comprehensive from the following description of embodiments in conjunction with the drawings.

FIG. 3 is a schematic diagram illustrating modules of a chroma adjustment apparatus according to some embodiments of the disclosure.

FIG. 4 is another schematic flowchart of the chroma adjustment method according to some embodiments of the disclosure.

FIG. 5 is yet another schematic flowchart of the chroma adjustment method according to some embodiments of the disclosure.

FIG. 6 is still another schematic flowchart of the chroma adjustment method according to some embodiments of the disclosure.

FIG. 7 is still yet another schematic flowchart of the chroma adjustment method according to some embodiments of the disclosure.

DETAILED DESCRIPTION OF PREFERRED EMBODIMENTS

Figures 1, 2:
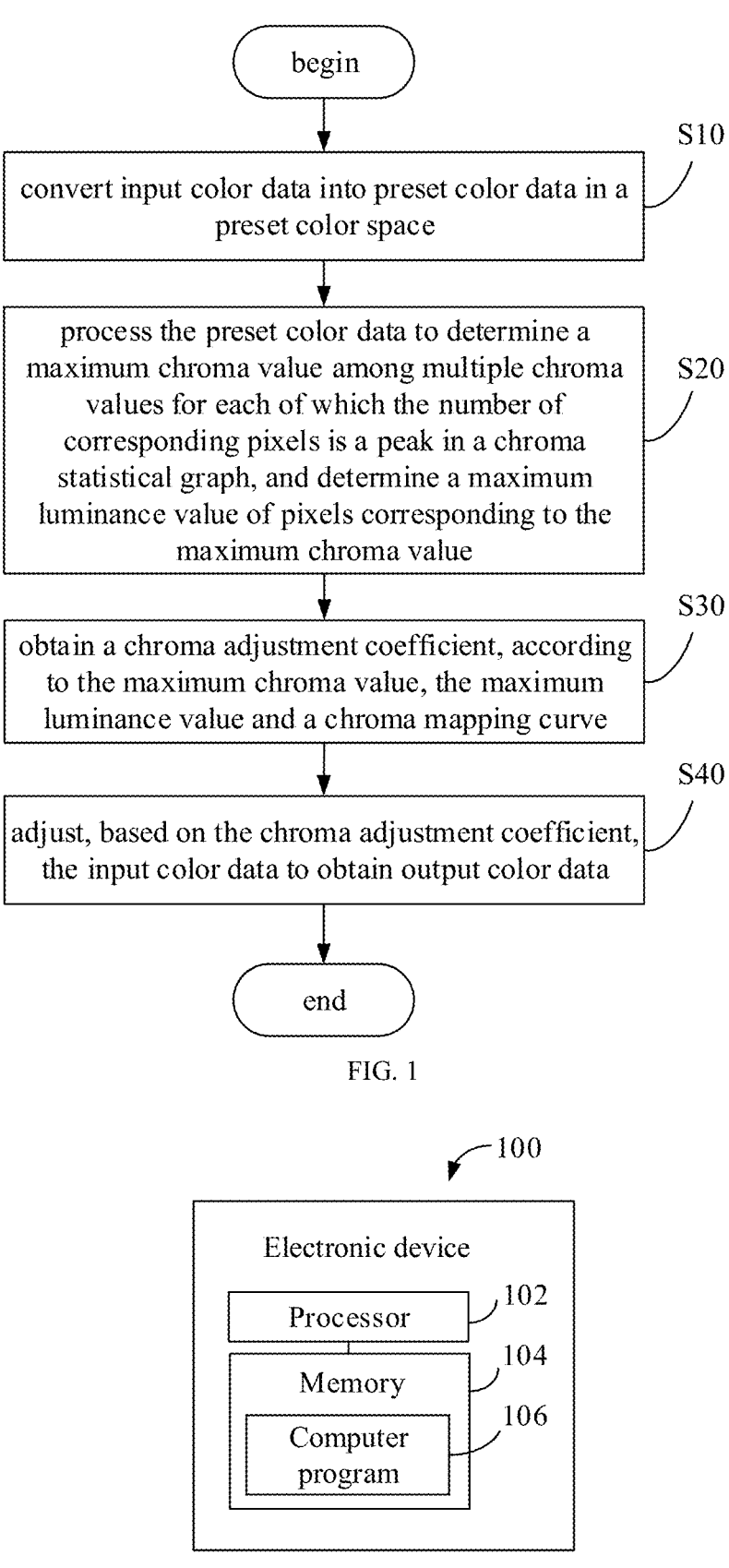
FIG. 1 is a schematic flowchart of a chroma adjustment method according to some embodiments of the disclosure.
FIG. 2 is a schematic structural diagram of an electronic device according to some embodiments of the disclosure.

Embodiments of the disclosure will be described below in detail. Examples of the embodiments are shown in the drawings, and throughout the disclosure, the same or similar reference signs represent the same or similar components or components having the same or similar functions. The embodiments described below with reference to the drawings are exemplary and intended for explaining the disclosure, rather than being construed as a limitation on the disclosure.

As illustrated in FIG. 1, the embodiments of the disclosure provides a chroma adjustment method. The method includes operations as follows.

At S10, input color data is converted into preset color data in a preset color space.

At S20, preset color data is processed to determine a maximum chroma value among multiple chroma values for each of which the number of corresponding pixels is a peak in a chroma statistical graph, and determine a maximum luminance value of pixels corresponding to the maximum chroma value.

At S30, a chroma adjustment coefficient is obtained according to the maximum chroma value, the maximum luminance value and a chroma mapping curve.

At S40, the input color data is adjusted based on the chroma adjustment coefficient, to obtain output color data.

As illustrated in FIG. 2, the embodiments of the disclosure provide an electronic device 100. The electronic device 100 includes a processor 102 and a memory 104 storing a computer program 106. When the computer program 106 is executed by the processor 102, the chroma adjustment method of the embodiments of the disclosure is implemented. In other words, the processor 102 is configured to: convert the input color data into the preset color data in the preset color space; process the preset color data to determine the maximum chroma value among multiple chroma values for each of which the number of corresponding pixels is a peak in the chroma statistical graph, and determine the maximum luminance value of pixels corresponding to the maximum chroma value; obtain the chroma adjustment coefficient, according to the maximum chroma value, the maximum luminance value and the chroma mapping curve; and adjust, based on the chroma adjustment coefficient, the input color data to obtain the output color data. The processor 102 may be a separate processor provided for the electronic device 100 to implement the chroma adjustment method. Alternatively, the processor 102 may be built in the electronic device 100. The disclosure is not limited herein.

As illustrated in FIG. 3, the embodiments of the disclosure further provide a chroma adjustment apparatus 110, and the chroma adjustment method of the embodiments of the disclosure can be implemented by the chroma adjustment apparatus 110. The chroma adjustment apparatus 100 includes a converting module 112, a processing module 114 and an adjusting module 116. S10 may be implemented by the converting module 112, S20 may be implemented by the processing module 114, and S30 may be implemented by the adjusting module 116. In other words, the converting module 112 is configured to convert the input color data into the preset color data in the preset color space. The processing module 114 is configured to: process the preset color data to determine the maximum chroma value among multiple chroma values for each of which the number of corresponding pixels is a peak in the chroma statistical graph, and determine the maximum luminance value of pixels corresponding to the maximum chroma value; and obtain the chroma adjustment coefficient, according to the maximum chroma value, the maximum luminance value and the chroma mapping curve. The adjusting module 116 is configured to adjust, based on the chroma adjustment coefficient, the input color data to obtain the output color data.

In the related art, when processing an image, it requires to adjust chroma of the image several times for different scenes, to achieve a realistic and natural effect. For example, when processing a portrait image taken at a night scene, it generally requires to improve brightness of the image due to the low brightness thereof. Chroma of the image would go up with the increase of the brightness, which easily leads to high chroma of the human skin when the brightness of the image is moderate, and thus results in an unsatisfied image effect. After the brightness of the image is improved, it is still necessary to adjust the chroma of the human skin, which is a cumbersome process.

With regard to the chroma adjustment method, the electronic device 100 and the chroma adjustment apparatus 110 according to the embodiments of the disclosure, the input color data is converted into the preset color data in the preset color space, and the preset color data is processed to determine the maximum chroma value among multiple chroma values for each of which the number of corresponding pixels is a peak in the chroma statistical graph, and determine the maximum luminance value of pixels corresponding to the maximum chroma value. The chroma adjustment coefficient is obtained, according to the maximum chroma value, the maximum luminance value and the chroma mapping curve. The input color data is adjusted based on the chroma adjustment coefficient. As such, the chroma of the image are enabled to be adjusted automatically, and the adjusted chroma of the image can be natural and realistic.

As illustrated in FIG. 4, the chroma adjustment method according to some embodiments includes operations as follows.

At S01, raw color data is converted into the input color data in a linear space.

In some embodiments, S01 may be implemented by the converting module 112. In other words, the converting module 112 is further configured to convert the raw color data into the input color data in the linear space.

In some embodiments, the processor 102 is further configured to convert the raw color data into the input color data in the linear space.

Specifically, the raw color data may be color data in a nonlinear space. When converting the input color data into the preset color data, the input color data needs to be in a form of data in the linear space. Thus, the raw color data is converted into the input color data in the linear space, before the input color data is converted into the preset color data. This make the input color data ready for the conversion into the preset color data, so that the preset color data can be processed to determine the maximum chroma value and the maximum luminance value. Then, the chroma adjustment coefficient is determined according to the maximum chroma value, the maximum luminance value and the chroma mapping curve, and the input color data is adjusted based on the chroma adjustment coefficient.

In some embodiments, the raw color data is in an RGB nonlinear space, the input color data is in an RGB linear space, and the preset color data is LCH (lightness chroma hue) color data. The color data in the RGB nonlinear space is first converted into color data in RGB linear space color data, then the color data in the RGB linear space is converted into color data in the LCH color space. The color data in the LCH color space is processed, to determine the maximum chroma value among multiple chroma values for each of which the number of corresponding pixels is a peak in the chroma statistical graph, and determine the maximum luminance value of pixels corresponding to the maximum chroma value. The chroma adjustment coefficient is determined according to the maximum chroma value, the maximum luminance value and the chroma mapping curve. The input color data is adjusted based on the chroma adjustment coefficient.

As such, the chroma of the image is enabled to be adjusted automatically, and the adjusted chroma of the image can be natural and realistic.

It can be understood that in the case where the raw color data is the input color data in the linear space, it is not necessary to convert the raw color data.

As illustrated in FIG. 5, in some embodiments, S10 may include operations as follows.

At S11, the input color data is processed to obtain a region of interest in an image corresponding to the input color data.

At S12, the input color data of the region of interest is converted into the preset color data in the preset color space.

In some embodiments, S11 and S12 may be implemented by the converting module 112. In other words, the converting module 112 is further configured to: process the input color data to obtain the region of interest in the image corresponding to the input color data, and convert the input color data of the region of interest into the preset color data in the preset color space.

In some embodiments, the processor 102 is further configured to: process the input color data to obtain the region of interest in the image corresponding to the input color data, and convert the input color data of the region of interest into the preset color data in the preset color space.

Specifically, since the image has a large region, in the process of adjusting the chroma of the image, the input color data of the image may be processed to select the region of interest. The input color data in the region of interest is converted into the preset color data in the preset color space, and the preset color data is processed to determine the maximum chroma value among multiple chroma values for each of which the number of corresponding pixels is a peak in the chroma statistical graph, and determine the maximum luminance value of pixels corresponding to the maximum chroma value. After that, the chroma adjustment coefficient is determined according to the maximum chroma value, the maximum luminance value and the chroma mapping curve, and the input color data is adjusted based on the chroma adjustment coefficient.

In some embodiments, the image is taken at a night scene, and the region of interest may be a high-brightness region in the image, where the high-brightness region may refer to a region where the brightness is relatively high. The input color data is in the RGB linear space, and the preset color data is the LCH color data. The high-brightness region in the image captured at the night scene is selected, and the color data in the RGB linear space of the high-brightness region is converted into LCH color data. The LCH color data is processed to determine the maximum chroma value among multiple chroma values for each of which the number of corresponding pixels is a peak in the chroma statistical graph, and determine the maximum luminance value of pixels corresponding to the maximum chroma value. After that, the chroma adjustment coefficient is determined according to the maximum chroma value, the maximum luminance value and the chroma mapping curve, and the input color data is adjusted based on the chroma adjustment coefficient.

In some other embodiments, the image may be a portrait, and the region of interest may be a face region in the image. The input color data is in the RGB linear space, and the preset color data is the LCH color data. The face region in the portrait is selected, and the color data in the RGB linear space of the face region is converted into LCH color data. The LCH color data is processed to determine the maximum chroma value among multiple chroma values for each of which the number of corresponding pixels is a peak in the chroma statistical graph, and determine the maximum luminance value of pixels corresponding to the maximum chroma value. After that, the chroma adjustment coefficient is determined according to the maximum chroma value, the maximum luminance value and the chroma mapping curve, and the input color data is adjusted based on the chroma adjustment coefficient.

The pixels in the image are screened to obtain the region of interest, and then the chroma adjustment is performed on the pixels in the region of interest, which can reduce the amount of data to be processed and improve the efficiency of image processing.

As illustrated in FIG. 6, in some embodiments, S11 includes operations as follows.

At S111, according to multiple pixel values of the input color data, an average value of the multiple pixel values and a maximum value of the multiple pixel values are determined.

At S112, a threshold of the multiple pixel values is determined according to the average value and the maximum value.

At S113, a pixel region where the pixel values are greater than the threshold is determined as the region of interest.

In some embodiments, S111, S112 and S113 may be implemented by the converting module 112. In other words, the converting module 112 is further configured to: determine, according to the multiple pixel values of the input color data, the average value of the multiple pixel values and the maximum value of the multiple pixel values; determine, according to the average value and the maximum value, the threshold of the plurality of pixel values; and determine the pixel region where the pixel values are greater than the threshold as the region of interest.

In other words, the processor 102 is further configured to: determine, according to the multiple pixel values of the input color data, the average value of the multiple pixel values and the maximum value of the multiple pixel values; determine, according to the average value and the maximum value, the threshold of the plurality of pixel values; and determine the pixel region where the pixel values are greater than the threshold value as the region of interest.

Specifically, the average value and the maximum value of the multiple pixel values are determined according to the multiple pixel values of the input color data, the threshold of the multiple pixel values is determined according to the average value and the maximum value, and the pixel region where the pixel values are greater than the threshold is determined as the region of interest. It is notable that the threshold of the multiple pixel values may be set according to factors, such as a type of the region of interest, an image scene, user setting, and an experience value, which is not specifically limited therein. For example, a median value of the average value and the maximum value may be set as the threshold.

In some embodiments, the pixel values of the input color data refer to brightness of the image. An average brightness and a maximum brightness of the multiple pixels in the image are determined according to the brightness of the input color data, and a median value of the average brightness and the maximum brightness is taken as a brightness threshold. A pixel region where the brightness is greater than the brightness threshold is taken as the region of interest.

In this way, it is possible to determine a range of the region of interest and adjust the chroma of the region of interest, which reduces the amount of data to be processed and improves the efficiency of image processing compared to adjusting the chroma of the entire image.

As illustrated in FIG. 7, in some embodiments, S20 includes operations as follows.

At S21, the preset color data in the region of interest is processed to obtain the chroma statistical graph corresponding to the region of interest.

At S22, the multiple chroma values for each of which the number of corresponding pixels is a peak in the chroma statistical graph are determined, and the maximum chroma value of the multiple chroma values is determined.

At S23, according to the maximum chroma value, a maximum luminance value of the pixels corresponding to the maximum chroma value is determined.

In some embodiments, S21-S23 may be implemented by the processing module 114. In other words, the processing module 114 is further configured to: process the preset color data in the region of interest to obtain the chroma statistical graph corresponding to the region of interest; determine the multiple chroma values for each of which the number of corresponding pixels is a peak in the chroma statistical graph, and obtain the maximum chroma value of the multiple chroma values; and determine, according to the maximum chroma value, the maximum luminance value of the pixels corresponding to the maximum chroma value.

In some embodiments, the processor 102 is further configured to: process the preset color data in the region of interest to obtain the chroma statistical graph corresponding to the region of interest; determine the multiple chroma values for each of which the number of corresponding pixels is a peak in the chroma statistical graph, and obtain the maximum chroma value of the multiple chroma values; and determine, according to the maximum chroma value, the maximum luminance value of the pixels corresponding to the maximum chroma value.

Specifically, the preset color data in the region of interest is processed to obtain the chroma statistical graph corresponding to the region of interest. The chroma statistical graph may be a bar graph, a line graph, a fan chart, a histogram, etc., which is not specifically limited herein. Subsequently, the multiple chroma values for each of which the number of corresponding pixels is a peak in the chroma statistical graph are determined, and the maximum chroma value of the multiple chroma values is determined. Based on the maximum chroma value, the maximum luminance value of the pixels corresponding to the maximum chroma value is determined.

It can be understood that, in the chroma statistical graph, the peak number of the pixels may mean that the number of pixels corresponding to a current chroma value is greater than the numbers of pixels corresponding to two chroma values adjacent to the current chroma value. The pixels corresponding to the maximum chroma value refer to pixels in the region of interest that have a relatively high chroma value and a large gray level. Based on the maximum chroma value, the maximum luminance value of the pixels corresponding to the maximum chroma value is determined, which further screens the pixels in the region of interest that need to perform the chroma adjustment. For example, when it requires to perform the chroma adjustment on pixels with a high brightness value in the image, pixels in the region of interest that has a high chroma value, a large gray level and a high luminance value are screened out.

Figure 8:
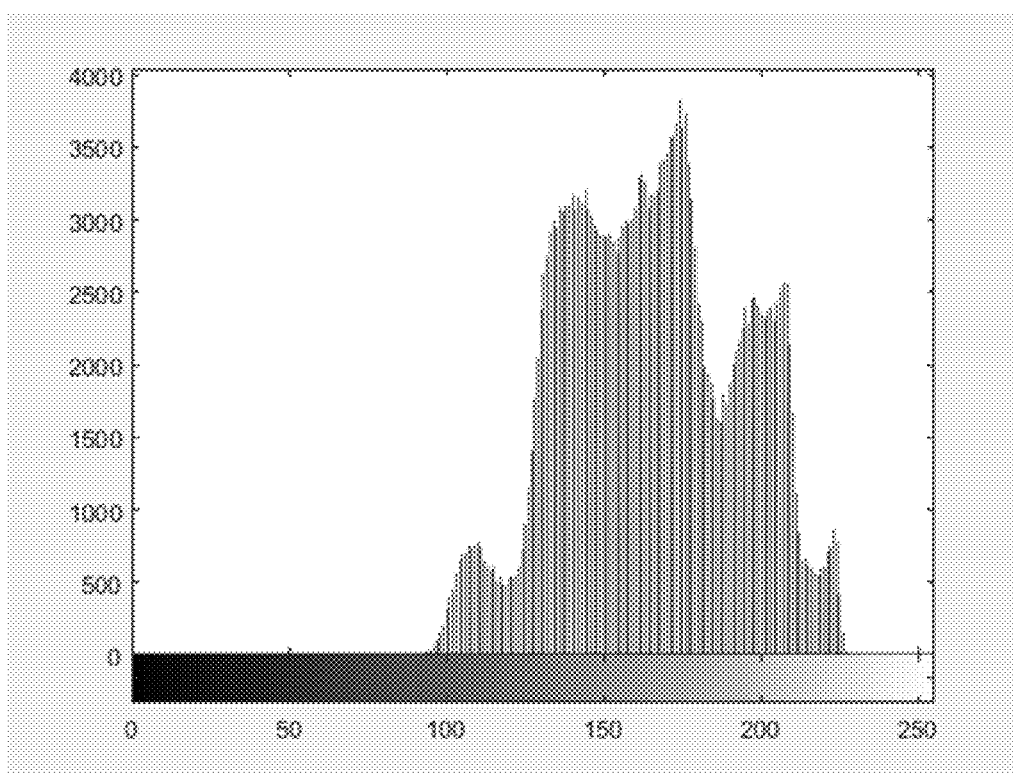
FIG. 8 is a chroma statistical graph according to some embodiments of the disclosure.
Figure 9:
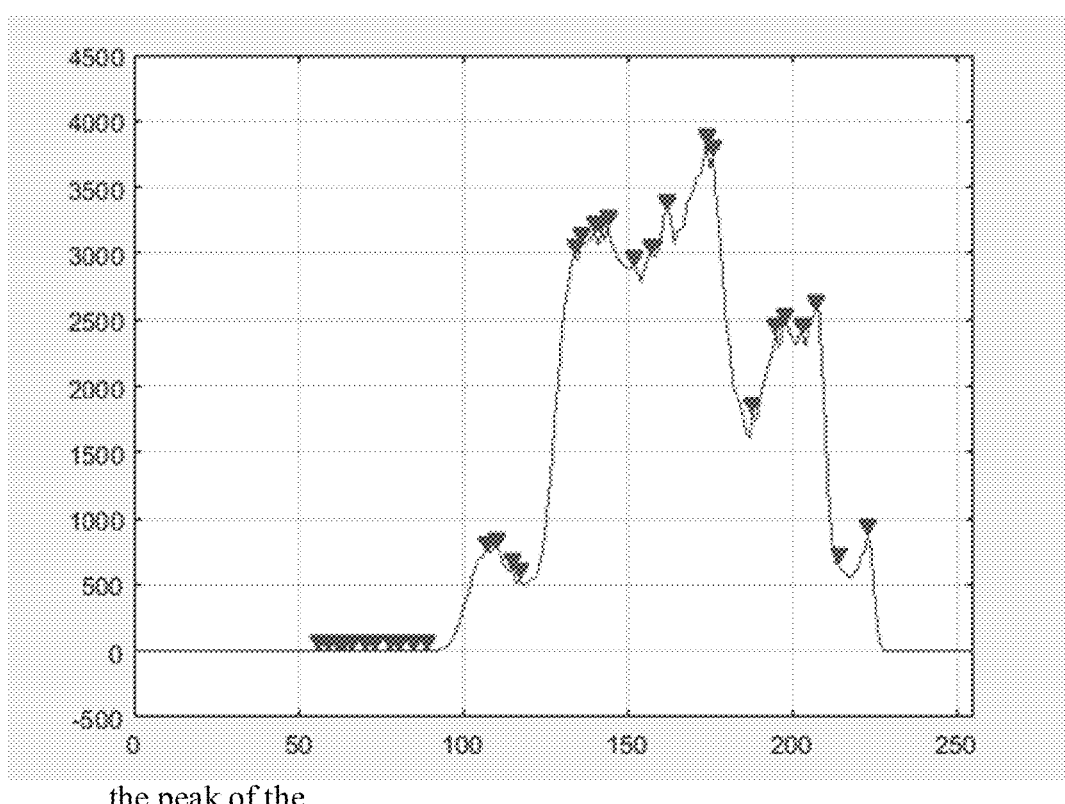
FIG. 9 is another chroma statistical graph according to some embodiments of the disclosure.

As illustrated in FIG. 8 and FIG. 9, in some embodiments, a histogram is used as the chroma statistical graph. The histogram can visually illustrate the number of pixels with the same chroma value, which is convenient for finding the peak of the numbers of the pixels. The horizontal axis of the histogram may represent the chroma value, and the vertical axis may represent the number of pixels, i.e., the pixel number. The chroma values in the chroma statistical graph are presented in gray levels, for example, the chroma values are indicated by the gray levels in a range of 0-255. In the chroma statistical graph, the pixel number of each gray level is counted in an order of smallest to largest gray level.

The preset color data in the region of interest is processed to obtain a chroma histogram corresponding to the region of interest. Multiple chroma values for each of which the number of corresponding pixels is a peak in the chroma histogram are determined, and multiple gray levels corresponding to the multiple chroma values are determined. The chroma values corresponding to the peaks are ordered according to the gray levels. As illustrated in FIG. 9, C_Locs_H represents the chroma value corresponding to a peak whose respective gray level is the maximum, and C_Locs_H is determined as the maximum chroma value. Based on the maximum chroma value, the maximum luminance value of the pixels corresponding to the maximum chroma value is determined.

As such, the maximum chroma value and the maximum luminance value are determined through the chroma statistical graph, and the luminance adjustment coefficient is obtained according to the maximum chroma value, the maximum luminance value and the chroma mapping curve. The input color data is adjusted based on the chroma adjustment coefficient. As such, the chroma of the image is enabled to be adjusted automatically, and the adjusted chroma of the image can be natural and realistic.

Figures 10, 11, 12:
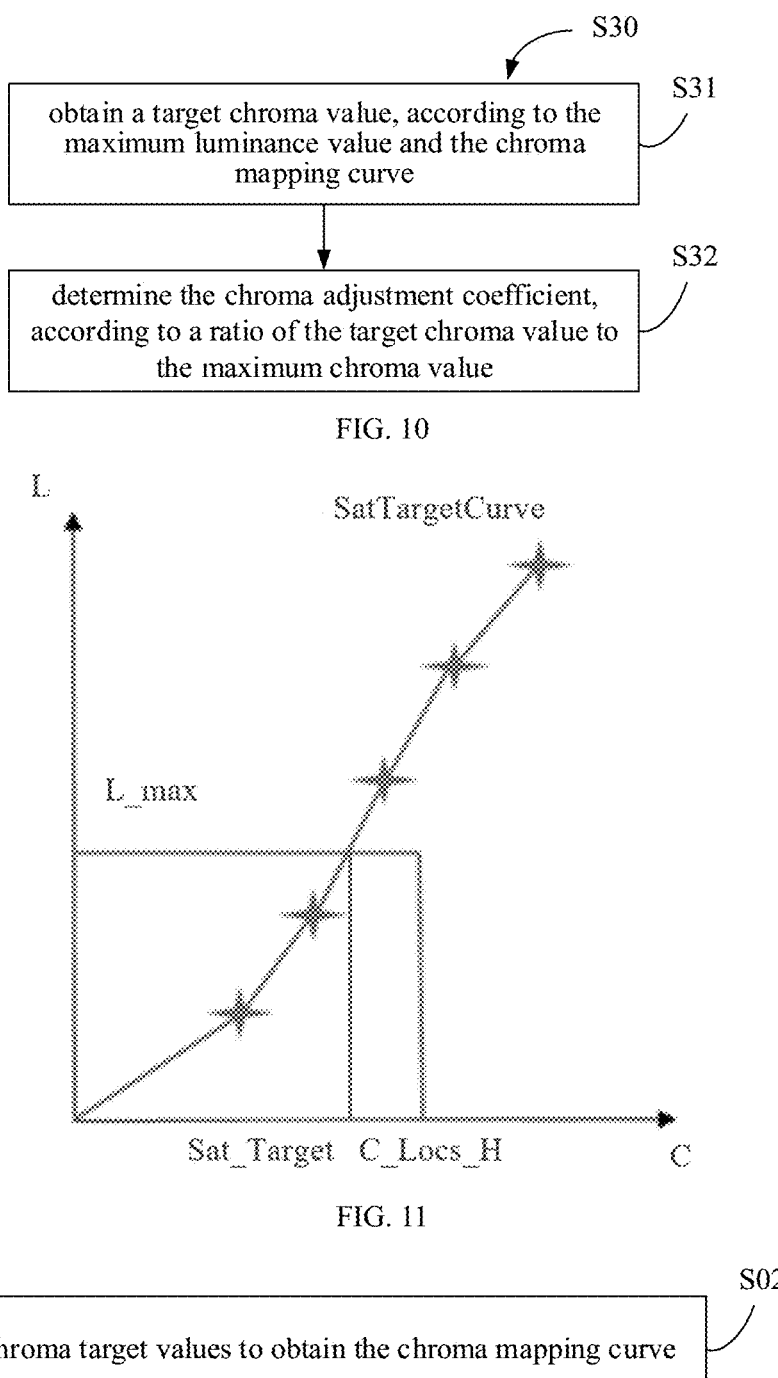
FIG. 10 is still yet another schematic flowchart of the chroma adjustment method according to some embodiments of the disclosure.
FIG. 11 is a chroma mapping curve according to some embodiments of the disclosure.
FIG. 12 is still yet another schematic flowchart of the chroma adjustment method according to some embodiments of the disclosure.

As illustrated in FIG. 10, in some embodiments, S30 includes operations as follows.

At S31, a target chroma value is obtained according to the maximum luminance value and the chroma mapping curve.

At S32, the chroma adjustment coefficient is determined according to a ratio of the target chroma value to the maximum chroma value.

In some embodiments, S31 and S32 may be implemented by the processing module 114. In other words, the processing module 114 is further configured to: obtain the target chroma value according to the maximum luminance value and the chroma mapping curve, and determine the chroma adjustment coefficient according to the ratio of the target chroma value to the maximum chroma value.

In some embodiments, the processor 102 is further configured to: obtain the target chroma value according to the maximum luminance value and the chroma mapping curve, and determine the chroma adjustment coefficient according to the ratio of the target chroma value to the maximum chroma value.

Specifically, the chroma mapping curve shows correspondences between the luminance values and the chroma values. The target chroma value can be determined according to the maximum luminance value and the chroma mapping curve, and the chroma adjustment coefficient is then determined according to the ratio of the target chroma value to the maximum chroma value.

As illustrated in FIG. 11, in some embodiments, the chroma mapping curve is represented as SatTargetCurve, the maximum luminance value is represented as L_max, and the target chroma value Sat_Target is obtained according to the maximum luminance and chroma mapping curve. The chroma adjustment coefficient Ks is determined according to a ratio of the target chroma value Sat_Target to the maximum chroma value C_Locs_H.

The input color data is adjusted based on the chroma adjustment coefficient. As such, the chroma of the image is enabled to be adjusted automatically, and the adjusted chroma of the image can be natural and realistic.

In some embodiments, the preset color space is a LCH color space.

Specifically, the input color data is converted into LCH color data in the LCH color space, which can enable a precise chroma adjustment and make the adjusted chroma of the image natural and realistic.

In some embodiments, the input color data is in an RGB color space. S40 is implemented by expressions as follows.

$$Ro=Ks*(Ri-Y)+Y;$$

$$Go=Ks*(Gi-Y)+Y;$$

$$Bo=Ks*(Bi-Y)+Y;$$

where Ro represents a red primary value in the output color data, Go represents a green primary value in the output color data, Bo represents a blue primary value in the output color data, Ks represents the chroma adjustment coefficient, Y represents a luminance value corresponding to a pixel obtained through conversion from the RGB color space to a YUV color space, Ri represents a red primary value in the input color data, Gi represents a green primary value in the input color data, and Bi represents a blue primary value in the input color data.

Specifically, the chroma adjustment coefficient Ks is substituted into the above expressions to obtain the red primary value Ro, the green primary value Go and the blue primary value Bo in the output color data. And Ro, Go and Bo are converted, through a Gamma operation, back to the color data in the linear space for output.

As such, the input color data is converted into the preset color data in the preset color space, the preset color data is processed to determine the maximum chroma value among multiple chroma values for each of which the number of corresponding pixels is a peak in the chroma statistical graph, and determine the maximum luminance value of pixels corresponding to the maximum chroma value. The chroma adjustment coefficient is obtained according to the maximum chroma value, the maximum luminance value and the chroma mapping curve, and the input color data is adjusted based on the chroma adjustment coefficient. As such, the chroma of the image is enabled to be adjusted automatically, and the adjusted chroma of image can be natural and realistic.

As illustrated in FIG. 12, in some embodiments, the chroma adjustment method further includes operations as follows.

At S02, chroma target values are fitted to obtain the chroma mapping curve.

In some embodiments, S02 may be implemented by the processing module 114. In other words, the processing module 114 is further configured to fit the target values to obtain the chroma mapping curve.

In some embodiments, the processor 204 is further configured to fit the chroma target values to obtain the chroma mapping curve.

Specifically, the chroma target values may be set according to a user factor, such as a user preference, a set scene, and a set mode, as well as an environmental factor, such as ambient brightness, ambient color temperature, and identified scene, which is not specifically limited herein. There may be multiple chroma target values, and the chroma mapping curve may be obtained by fitting the multiple chroma target values and comparing linear interpolations of the multiple chroma target values.

As such, the chroma mapping curve can be set to meet the user's needs under the premise of conforming to the environmental factors, which optimizes the user experience while ensuring the natural and realistic effect of the adjusted chroma of the image.

The embodiments of the disclosure further provide a non-transitory computer-readable storage medium storing a computer program thereon. The computer program, when being executed by one or more processors, causes operations of the chroma adjustment method of any one of the above embodiments to be implemented.

Those skilled in the art can understand that all or part of the processes in the methods of the above embodiments can be implemented by instructing relevant hardware through a computer program. This program may be stored in a non-transitory computer-readable storage medium. When the program is executed, the process of any of the above embodiments can be realized. The storage medium may be a magnetic disk, an optical disk, a read-only memory (ROM), or the like.

The foregoing embodiments show only several implementations of this disclosure and are described in detail, which however are not to be construed as a limitation to the scope of this disclosure. It is notable that, for those skilled in the art, several modifications and improvements can be made without departing from the idea of this disclosure, but which all fall within the protection scope of this disclosure. Therefore, the protection scope of the disclosure should be subject to the appended claims.

What is claimed is:

1. A chroma adjustment method, comprising:
  converting input color data into preset color data in a preset color space;
  processing the preset color data to determine a maximum chroma value among a plurality of chroma values for each of which a number of corresponding pixels is a peak in a chroma statistical graph, and determining a maximum luminance value of pixels corresponding to the maximum chroma value;
  obtaining a chroma adjustment coefficient, according to the maximum chroma value, the maximum luminance value and a chroma mapping curve; and
  adjusting, based on the chroma adjustment coefficient, the input color data to obtain output color data;
  wherein the method further comprises:
  determining, as a peak, the number of corresponding pixels of a chroma value, in response to the number of corresponding pixels of the chroma value being greater than both numbers of corresponding pixels of two chroma values adjacent to the chroma value, thereby determining the plurality of chroma values for each of which the number of corresponding pixels is the peak in the chroma statistical graph.

2. The chroma adjustment method as claimed in claim 1, further comprising:
  converting raw color data in a nonlinear space into the input color data in a linear space, wherein the linear space and the preset color space are different color spaces.

3. The chroma adjustment method as claimed in claim 1, wherein the converting input color data into preset color data in a preset color space, comprises:

processing the input color data to obtain a region of interest in an image corresponding to the input color data; and converting input color data of the region of interest into the preset color data of the region of interest in the preset color space.

4. The chroma adjustment method as claimed in claim 3, wherein the processing the input color data to obtain a region of interest in an image corresponding to the input color data, comprises:

determining, according to a plurality of pixel values of the input color data, an average value of the plurality of the pixel values and a maximum value of the plurality of the pixel values;

determining, according to the average value and the maximum value, a threshold of the plurality of pixel values; and determining a pixel region where the pixel values are greater than the threshold, as the region of interest.

5. The chroma adjustment method as claimed in claim 4, wherein the determining, according to the average value and the maximum value, a threshold of the plurality of pixel values, comprises:

determining, as the threshold, a median value between the average value and the maximum value.

6. The chroma adjustment method as claimed in claim 3, wherein the processing the preset color data to determine a maximum chroma value among a plurality of chroma values for each of which the number of corresponding pixels is a peak in a chroma statistical graph, and determine a maximum luminance value of pixels corresponding to the maximum chroma value, comprises:

processing the preset color data of the region of interest, to obtain the chroma statistical graph corresponding to the region of interest;

determining the plurality of chroma values for each of which the number of corresponding pixels is a peak in the chroma statistical graph, and obtaining the maximum chroma value of the plurality of chroma values; and determining, the maximum luminance value of the pixels corresponding to the maximum chroma value.

7. The chroma adjustment method as claimed in claim 3, wherein the processing the input color data to obtain a region of interest in an image corresponding to the input color data, comprises:

in response to the image being a portrait, determining a face region in the image as the region of interest.

8. The chroma adjustment method as claimed in claim 1, wherein the obtaining a chroma adjustment coefficient according to the maximum chroma value, the maximum luminance value and a chroma mapping curve, comprises:

obtaining a target chroma value, according to the maximum luminance value and the chroma mapping curve; and determining the chroma adjustment coefficient, according to a ratio of the target chroma value to the maximum chroma value.

9. The chroma adjustment method as claimed in claim 1, wherein the preset color space is an LCH color space.

10. The chroma adjustment method as claimed in claim 1, wherein the input color data is in an RGB color space, and the adjusting, based on the chroma adjustment coefficient, the input color data to obtain output color data is implemented by using the following expressions:

$$Ro = Ks*(Ri-Y)+Y;$$

$$Go = Ks*(Gi-Y)+Y;$$

$$Bo = Ks*(Bi-Y)+Y;$$

where Ro represents a red primary value in the output color data, Go represents a green primary value in the output color data, Bo represents a blue primary value in the output color data, Ks represents the chroma adjustment coefficient, Y represents a luminance value corresponding to a pixel obtained through conversion from the RGB color space to a YUV color space, Ri represents a red primary value in the input color data, Gi represents a green primary value in the input color data, and Bi represents a blue primary value in the input color data.

11. The chroma adjustment method as claimed in claim 10, further comprising:

performing a Gamma operation on Ro, Go and Bo to obtain the output color data in a linear space.

12. The chroma adjustment method as claimed in claim 1, further comprising:

fitting chroma target values to obtain the chroma mapping curve.

13. An electronic device, comprising one or more processors, wherein the one or more processors are configured to:

convert input color data into preset color data in a preset color space;

process the preset color data to determine a maximum chroma value among a plurality of chroma values for each of which a number of corresponding pixels is a peak in a chroma statistical graph, and determine a maximum luminance value of pixels corresponding to the maximum chroma value;

obtain a chroma adjustment coefficient, according to the maximum chroma value, the maximum luminance value and a chroma mapping curve; and adjust, based on the chroma adjustment coefficient, the input color data to obtain output color data;

wherein the one or more processors are further configured to: determine, as a peak, the number of corresponding pixels of a chroma value, in response to the number of corresponding pixels of the chroma value being greater than both numbers of corresponding pixels of two chroma values adjacent to the chroma value, thereby determining the plurality of chroma values for each of which the number of corresponding pixels is the peak in the chroma statistical graph.

14. The electronic device as claimed in claim 13, wherein the one or more processors are configured to:

convert raw color data in a nonlinear space into the input color data in a linear space; and convert the input color data in a linear space into the preset color data in a LCH color space.

15. The electronic device as claimed in claim 13, wherein the one or more processors are configured to:

process the input color data to obtain a region of interest in an image corresponding to the input color data; and convert input color data of the region of interest into the preset color data of the region of interest in the preset color space.

16. The electronic device as claimed in claim 15, wherein the one or more processors are configured to:

determine, according to a plurality of pixel values of the input color data, an average value of the plurality of the pixel values and a maximum value of the plurality of the pixel values;

determine, according to the average value and the maximum value, a threshold of the plurality of pixel values; and determine a pixel region where the pixel values are greater than the threshold, as the region of interest.

17. The electronic device as claimed in claim 13, wherein the one or more processors are configured to:

obtain a target chroma value, according to the maximum luminance value and the chroma mapping curve; and determine the chroma adjustment coefficient, according to a ratio of the target chroma value to the maximum chroma value.

18. The electronic device as claimed in claim 13, wherein the input color data is in an RGB color space, and the one or more processors is configured to:

adjust, based on the chroma adjustment coefficient, the input color data to obtain output color data by using the following expressions:

$$Ro = Ks*(Ri-Y)+Y;$$

$$Go = Ks*(Gi-Y)+Y;$$

$$Bo = Ks*(Bi-Y)+Y;$$

where Ro represents a red primary value in the output color data, Go represents a green primary value in the output color data, Bo represents a blue primary value in the output color data, Ks represents the chroma adjustment coefficient, Y represents a luminance value corresponding to a pixel obtained through conversion from the RGB color space to a YUV color space, Ri represents a red primary value in the input color data, Gi represents a green primary value in the input color data, and Bi represents a blue primary value in the input color data.

19. A non-transitory computer-readable storage medium storing a computer program thereon, wherein the computer program, when being executed by one or more processors, causes operations of a chroma adjustment method be implemented, and the method comprises:

converting input color data into preset color data in a preset color space processing the preset color data to determine a maximum chroma value among a plurality of chroma values for each of which a number of corresponding pixels is a peak in a chroma statistical graph, and determining a maximum luminance value of pixels corresponding to the maximum chroma value;

obtaining a chroma adjustment coefficient, based on the maximum chroma value, the maximum luminance value and a chroma mapping curve; and adjusting, based on the chroma adjustment coefficient, the input color data to obtain output color data;

wherein the method further comprises:

determining, as a peak, the number of corresponding pixels of a chroma value, in response to the number of corresponding pixels of the chroma value being greater than both numbers of corresponding pixels of two chroma values adjacent to the chroma value, thereby determining the plurality of chroma values for each of which the number of corresponding pixels is the peak in the chroma statistical graph.

\* \* \* \* \*